Feb. 4, 1958
R. E. RUSKIN ET AL
2,821,853
WATER DEPTH INDICATOR
Filed Feb. 3, 1945
3 Sheets-Sheet 1
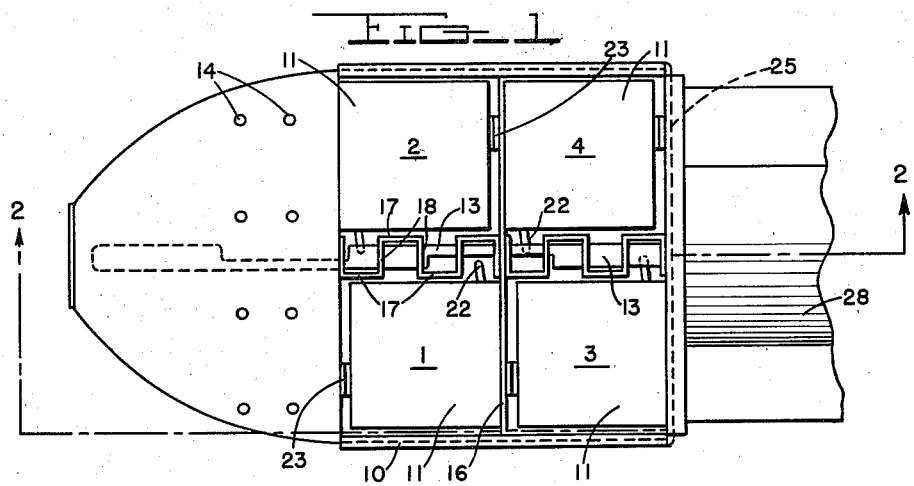
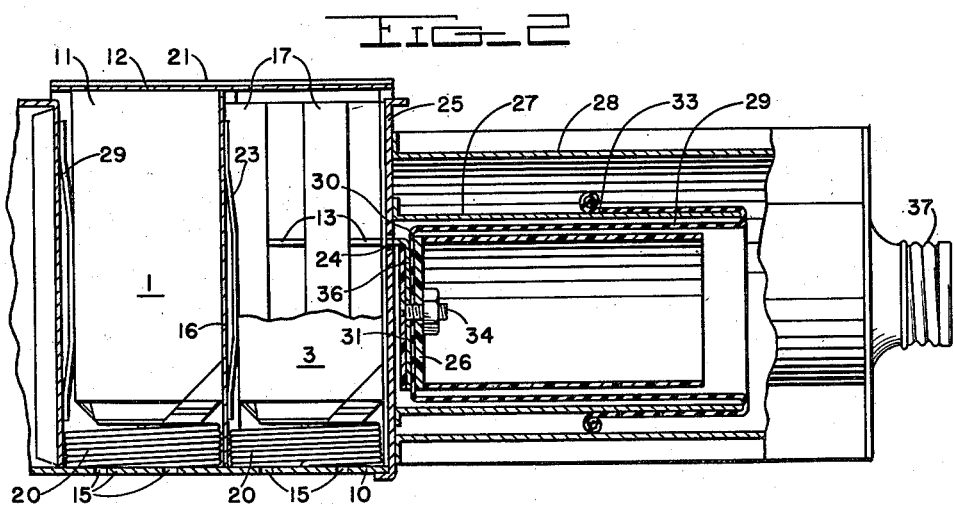
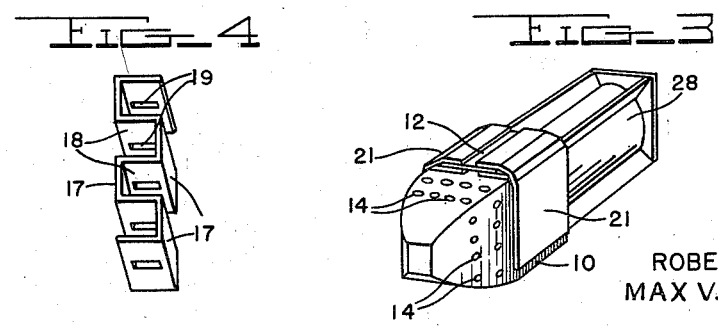
Inventors
ROBERT E. RUSKIN
MAX V. MORGAN
By Murray O. Hayes
Attorney

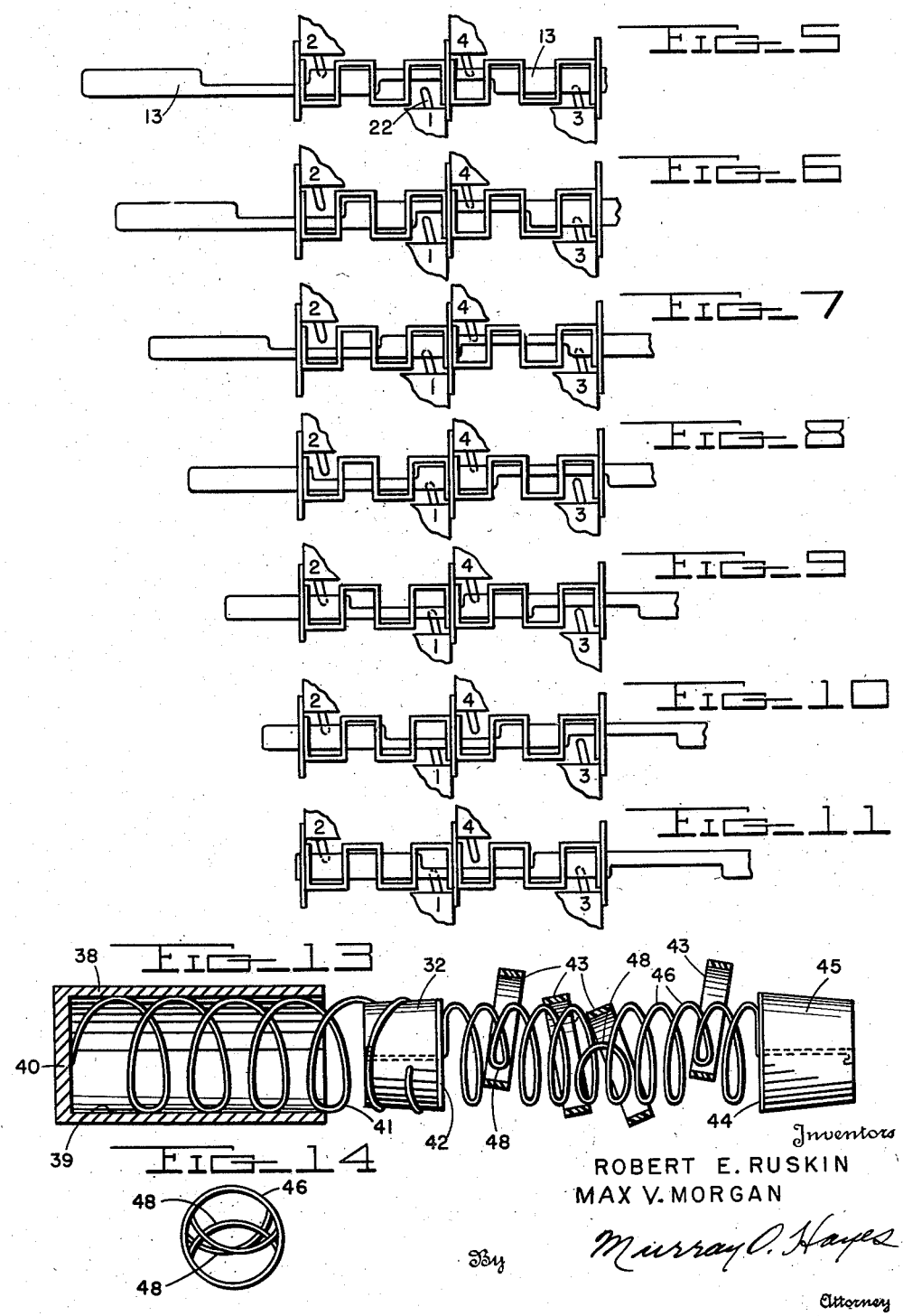

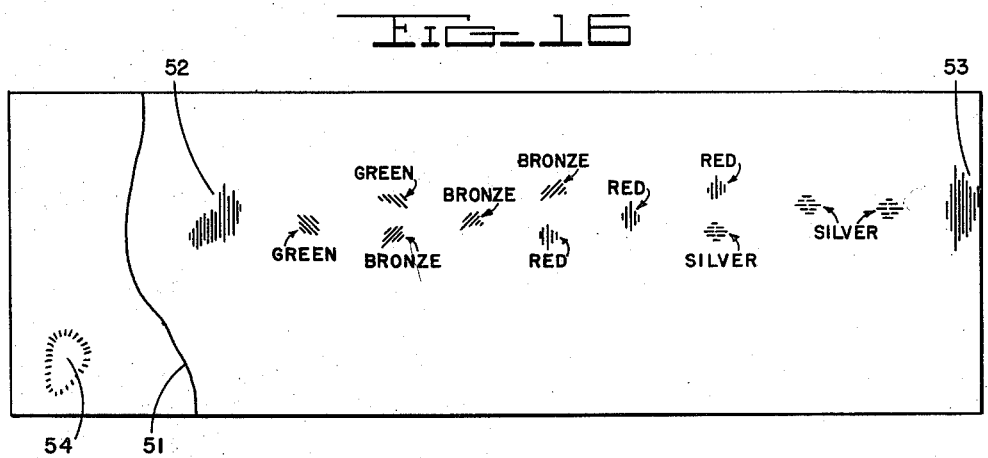
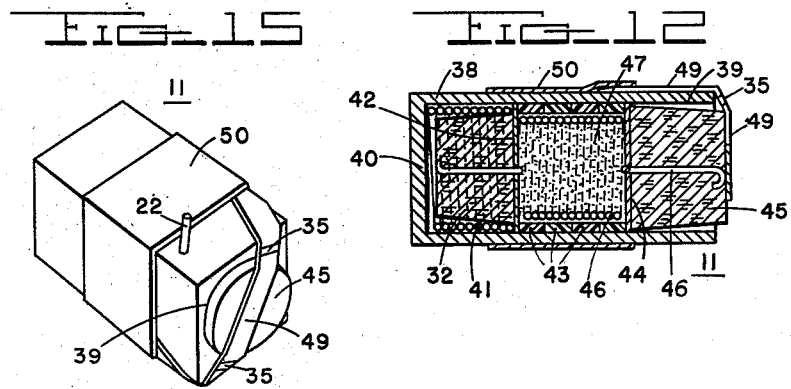
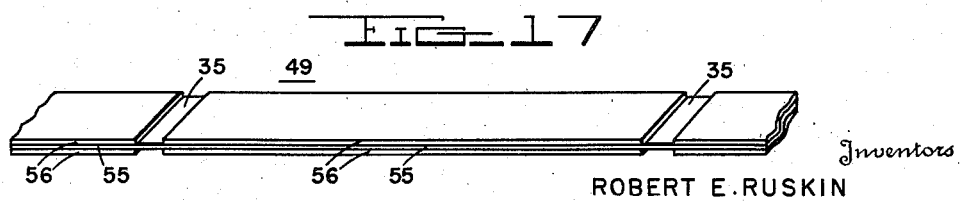

United States Patent Office 2,821,853
Patented Feb. 4, 1958

2,821,853
WATER DEPTH INDICATOR

Robert E. Ruskin, Washington, D. C., and Max V. Morgan, United States Navy

Application February 3, 1945, Serial No. 576,110

9 Claims. (Cl. 73—290)

(Granted under Title 35, U. S. Code (1952), sec. 266)

The present invention relates in general to depth indicating devices and more particularly to means for pre-entrance sounding of beach water-areas or other waterways.

The invention has as its main object the provision of means whereby aerial reconnaissance personnel may obtain soundings or a depth chart of water areas adjacent to enemy occupied or enemy controlled territory, or otherwise so situated as to make it desirable to obtain such data before entering into these areas with surface craft.

Another object is to provide means whereby such soundings may be made over a large area, rapidly and with a permanent record; whereby contemplated landing areas may be charted with minimum lapse of time after reconnaissance. Various other objects and advantages of the invention will become apparent upon a perusal of the following specification and the drawings accompanying same:

In a preferred embodiment of the invention herein disclosed in detail, these objects are obtained through the use of a special, sinkable container carrying several buoyant signal elements arranged to be selectively released from the container in one of a plurality of different groups automatively selected in response to the degree of hydrostatic pressure in the immediate vicinity of the container after the latter, deposited into the water from a reconnaissance plane, has reached bottom. The released signal element or elements and these only rising to the surface of the water remain for an indefinite time in a visible or at least a photographable condition indicating, by the particular group of one or more signal elements the depth from which they were released. An aerial photograph of the reconnoitered area showing the different signals at the surface above their points of release from the bottom thus provides a depth chart of the area. In the drawings:

Figure 1 is a top plan view;

Figure 2 is a section on the line 2—2 of Figure 1;

Figure 3 is a reduced-scale perspective of the assembled device;

Figure 4 is a fragmentary perspective of the corrugated partition;

Figures 5 to 11 are fragmentary plan views showing the selective barring means in different successive positions.

Figure 12 is a longitudinal cross-sectional view of one of the buoyant signal elements.

Figure 13 is a side elevation of a signal element partly expanded after release;

Figure 14 is an end view of the scattering spring showing the cross convolutions.

Figure 15 is a perspective view of one of the signal elements;

Figure 16 represents a color photograph of the surface of a reconnoitered water area.

Figure 17 is an enlarged detail view of the holding strip.

Referring to the drawings in detail, all of the mechanical views with the exception of Figures 3 and 17 are on a substantially full scale. Figures 1 to 3 show the device assembled ready for use, the latter on a much reduced scale. The device comprises in general a carrier or container 10 in which a plurality of buoyant signal elements 11 are releasibly held by a common clamping or holding means 12, and selectively barred from release by a barring means in the form of a selector bar 13 moveable into different positions in response to different hydrostatic pressures. The container 10 preferably of sheet metal is rendered readily sinkable by the provision of scuttle holes 14 in all four sides of the nose end of the container, and 15 in the bottom wall of the signal-element holding portion. Individual cells for each of the 4 singal elements are formed by the centrally disposed transverse partition wall 16 and a centrally disposed longitudinal partition wall 17 the latter being rectanguarly corrugated to form short transverse vertical wall sections 18 having guide slots as indicated in Figure 4 at 19, for guiding the selector bar 13. In each of the cells, above mentioned, is housed one of the signal elements 11 here marked 1, 2, 3, and 4 respectively in Figure 1, representing the four different kinds of signals used and to be later described. Each signal element 11 is held down in place against the tension of an ejector spring 20 by means of a common holding and timing means consisting of a strip 12 of water soluble material, in the present instance, polyvinyl alcohol joining the narrowly spaced ends of the holding strips 21 (Figure 3) secured to the sides of the container 10. In the present embodiment the strips 21 are of adhesive coated cellophane.

Each of the signal elements 11 are provided with a detaining pin 22 similarly arranged in all of the signal elements so that when such elements are placed in their cells the pin 22 of the four different elements will project into different ones of the channels formed by the short transverse wall sections 18, as indicated in Figure 1, the pins projecting into the channels below the selector bar 13. Leaf springs 23, one for each cell, are each arranged to urge its associated signal element against the side wall of its cell nearest the channel into which the pin is to project thus assuring accurate placement of the signal elements for control by the selector bar 13. It is to be pointed out here in passing, that the selector bar is relieved from drag due to engagement with the retaining pins 22 by virtue of the latter being hold down by the holding and timing element 12 with the pins substantially below and out of contact with the lower surface of the selector bar while the bar is moving during change of hydrostatic pressure and until the timing element has released.

For operation of the selector bar 13 in response to hydrostatic pressure, the bar is extended through an opening 24 in the rear wall 25 of the casing 10 into connection with a displacement element in the form of a cylindrical, skirted-piston 26 substantially, freely movable in a guide cylinder 27. The latter, secured at one end to the rear wall of the casing 10 in hermetically sealed relation with the rear wall, extends rearwardly of the wall into a sealed chamber 28. To insure a substantially free movement of the piston, it is very loosely fitted within the guide cylinder 27 and provided with a thin rubber tube 29 hermetically sealing the space between the periphery of the head of the piston and the side of the guide cylinder. The rubber tube extends through the guide cylinder between the latter and the piston with a closed bottom portion 30 extending over the head of the piston and between the latter and a clamping plate 31, with an open end extended around the outer surface of the guide cylinder 27. The closed end 30 of the tube 29 is cemented to the piston head, while the open end is cemented to the guide cylinder at 33.

A bolt 34 clamps the clamping plate 31 against the piston head with the downwardly bent portion 36 of the selector rod 13 and the bottom of the rubber tube between. Thus any increase in pressure in the space surrounding the casing, over that within the sealed chamber 28 will move the displacement piston inwardly of the chamber to effect an equalization of such pressure, which movement is imparted to the selector bar 13. For establishing a suitable reference pressure within the sealed chamber 28, for example in the present instance atmospheric pressure, such chamber is provided with a removable closure cap 37 which may be removed to permit the interior of the chamber 28 to assume atmospheric pressure, with the displacement piston in the extreme left-hand or outermost position as shown in Figure 2, after which the cap may be replaced to seal the chamber.

In the present embodiment as shown in Figures 1 and 2 with the selector rod 13 in the extreme left-hand position, the retaining pin 22 of only the signal element No. 1 is in register with one of the cut-away portions of the selector bar, and therefore free to permit the signal element No. 1 to be ejected by the force of the ejector spring 20, from the casing 10 upon release of the holding element 22. All of the other detaining pins 22 remain barred by a portion of the selector bar, therefore preventing release of their respective signal elements 2, 3, and 4. Figures 5 to 11 show the seven different successive positions of the selector bar 13 representing successive degrees of hydrostatic pressure corresponding to successive depths of say zero to approximately one and one-half feet, one and one-half feet to three feet, three to five feet, five to seven feet, seven to nine feet, nine to eleven feet and eleven feet on to indefinite depths. Thus when the device is first dropped into the water, the selector bar remains in the position shown in Figure 5 leaving signal element No. 1 free unless a depth of approximately one and a half feet is exceeded, whereupon the selector bar moving to the right with the movement of the displacement piston will assume the position shown in Figure 6 still leaving the signal element No. 1 unbarred, and in addition freeing the signal element No. 2. This condition remains until a three foot depth is exceeded, whereupon the selector bar moves into the position indicated in Figure 7, barring signal No. 1 against release and permitting signal No. 2 to remain free. This condition remains until a five foot depth is exceeded. In depths from five to seven feet the control bar will assume the position indicated in Figure 8 leaving signal No. 2 free to release and in addition clearing signal No. 3 for release. Between depths of approximately seven to nine feet the selector bar assumes the position shown in Figure 9 where all the signal elements are barred against release except No. 3. From nine to eleven feet the bar moves to free signals 3 and 4, as indicated in Figure 10. From eleven feet on to greater depths the selector bar assumes the position shown in Figure 11 barring signal No. 3 and leaving only signal No. 4 in condition for release.

In the present embodiment the thickness of the timing element 12, a strap of polyvinyl alcohol, is so chosen as to maintain sufficient strength to hold the strips 21 together across the top of the device until the device after having entered the water has had time to reach the greatest of the depths above mentioned and the selector bar time to move into the extreme position of Figure 11, if at or beyond the maximum depth. In the present instance this time is about 6 seconds. By the end of this period the timing element 12 is weakened to the point of rupture thus releasing whatever of the signal elements Nos. 1, 2, 3, and 4 are not barred by the selector bar 13. The signal elements which remain barred by the selector bar 13 remain locked in the container 10 and ineffective. Nos. 1 to 4 are thus released in groups of one or two of the signal elements selected by the selector bar according to the depth of the bottom upon which the device has come to rest. As will be clear from the series of Figures 5 to 11 the group released will be one of a series of seven as follows: (1), (1 and 2), (2), (2 and 3), (3), (3 and 4) and (4).

Referring now to the structure of the signal elements 11, one of which is shown in section in Figure 12, these are substantially identical except for the type of signal which they display. They each comprise a cartridge shell 38 of suitable light material in the present instance wood, having a substantially square external cross-sectional contour, as indicated in Figure 15 with a cylindrical bore 39 and closed bottom portion 40. In the bottom of the bore is situated an ejecting spring 41 compressed therein against the bottom 40, having its lower end abutting the bottom 40 and its upper end secured to a core element 32 of cork or other light material which in turn is secured to a disk-shaped bulkhead member 42. The member 42 forms the bottom bulkhead of a cylindrical chamber formed by a stack of abutting ring elements 43, and closed at the top by a bulkhead member 44. To the upper bulkhead member 44 is secured a spacer core-element 45 of cork or other suitable light material. Nested within the cylindrical chamber formed by the abutting rings 43 is an expandable scattering-coil element 46 of spring wire. Also within this chamber together with the helix formed by the scattering coil 46 is packed a suitable visual or photographable signal material 47 in powdered form, which may be a fluorescent dye, a pigment powder or a metallic powder capable of being spread upon the surface of a body of water to form a visible or photographable signal. The spacer elements 32 and 45 are secured to the disk-shaped bulkheads adjacent to them and to the ends of the scattering spring by extension of opposite ends of the scattering spring radially along the inner faces of the bulkhead elements to and through their centers to the remote ends of the spacer elements, where such spring terminals are bent back upon themselves into the body material of the spacer elements as shown in Figure 12.

This complete assemblage of parts within the cartridge shell 38 is held therein against the tension of the ejector spring 41, and scattering spring 46 by means of a holding strip 49 bound across the open end of the cartridge by a band 50 of adhesive cellophane and provided with time-seal portions 35 of a material adapted to be weakened in the presence of water, such as sheet polyvinyl alcohol a water-soluble material. The portions 35 are of a thickness sufficient to delay rupture until after the signal element has reached the surface of the water. In the present instance this time is in the neighborhood of 30 seconds, for which a strip of polyvinyl alcohol of about two thousandths of an inch in thickness was found satisfactory. Due to mechanical limitations in the showing of thin films, the holding strip 49 with its time-seal portions 35 is shown as a single layer strip. Actually, this is a compound strip as shown much enlarged in Figure 17, comprised of a central layer 55 of sheet polyvinyl alcohol with covering layers 56 of a sheet material non-soluble in water, such as adhesive cellophane. Portions of the covering layers of cellophane on opposite sides of the polyvinyl alcohol strip are cut away to expose the time seal portions 35.

As the weight distribution of the signal element 11 is substantially symmetrical, the signal element tends to float in a position very slightly tilted from the horizontal with the open end of the cartridge uppermost, and the face of the open end substantially half submerged with at least one corner of the open end in contact with the water. Contact of at least one of the time seals 35 with the water therefore is assured by having the holding strip 49 cross the open end of the cartridge shell diagonally as shown in Figure 15.

After the signal element has remained at the surface of the water for a short time the time seal becomes sufficiently weak to rupture, permitting the contents of the cartridge to be forceably ejected as indicated in Figure 13, where the parts are shown extended to substantially half their fully extended length. Here it will be seen how the scattering spring 46 drives the bulkheads 42 and 44 apart disrupting the cylindrical cell formed by the rings 43 into its separate constituent ring elements to scatter the signal powder over the surface of the water. To further insure a thorough breaking up and scattering of the charge of signaling powder the scattering spring 46 is provided at intervals with cross convolutions 48 extending across the cylindrical space within the scattering spring helix. This will be clear upon reference to Figure 14, which shows the scattering spring viewed from one end. In the different signal cartridges the capacity of the charge-holding cell 47 formed by the rings 43 may be varied without variation in its component parts, by use of more or fewer of such rings. The difference in space occupied by the various size cells being compensated for by variation in the axial length of the spacing plug 45. This enables the amount of the charge to be varied according to the kind of material used for the different signal powders. In the present embodiment, the signal powders used for the different kinds of signal elements are No. 1 fluorescine, for green, No. 2 a bronze powder, No. 3 rhodamine, for red, and No. 4 aluminum powder for the silver or white. These are found to produce signals enduring for a time ample to permit the first as well as the last appearing signals to be photographed upon return of the reconnaissance plane. It will be understood that the signal elements 11 remaining locked in the casing 10 will remain ineffective even after their timing strips 35 dissolve, due to the fact that the bulk-head element 44 and cork element 45 will be held in place by abutment against the springs 20.

Because of the asymmetry in weight distribution of the completely assembled and charged casing as shown in Figure 3, due to the absence of a metallic cover-wall above the signal elements 11, the presence of the heavier ejector springs 20 and water at the bottom, and the offsetting of the pressure responsive mechanism in the sealed chamber 28 toward the bottom, the device will always position itself in the manner indicated in Figure 3 with the time control element 12 and open side of the container on top when the container rests at the bottom of the water being sounded. In use several of the complete devices as shown in Figure 3 are dropped from a reconnaissance airplane over the water area to be charted, preferably by dropping them at regular intervals on a run, away from or toward a shore line on which a landing is to be made. After a short period of time sufficient to permit the signal element from the last dropped device to release its signal the reconnaissance plane returns over the course taking a photograph or photographs of the different kinds of signal spots produced on the surface of the water and differing in kind according to the depth from which their producing signal elements were released. Figure 16 represents such a photographic chart of a portion of a waterway extending from a shallow beach out to a depth of over 11 feet. This is a color photograph showing the green and red in natural color, the bronze as a reddish brown rather distinct from the bright red of the No. 3 signal element, and the aluminum as white, thus the bronze spots are indicated in Figure 16 by the conventional angular hatching representing brown and the white or aluminum spots by the conventional dotted-line hatching representing silver. The shore line indicated at 51 will of course be readily distinguishable in the photographic chart. When photographed from a rather great height, for example two or three thousand feet or more the spots will appear quite small and will be difficult at times to locate, but once located may be readily picked up by the eye and followed for photographing. To facilitate location of the beginning and end of the signal spots, it is preferable to drop to the surface of the water at the beginning and end of the run, what is known as a sea marker or drift signal of any known or other suitable form capable of producing a large and very readily discernible signal spot on the water. Such sea marker signal spots are indicated in Figure 16 at 52 and 53. The sea marker 52 together with the shore line 51 and some fixed object on the land such as a rock 54 or other land marks enable the photographic chart to be identified with a particular portion of the area surveyed, while the distances between the various signal spots may be quite adequately ascertained from a knowledge of the intervals at which the devices were dropped and the speed of the reconnoitering plane and its height during the dropping of the various signal devices.

While but one particular embodiment of the invention has been shown and described herein for the sake of disclosure it is to be understood that the invention is not limited to such specific embodiment, but contemplates all such variations and modifications of the invention as fall fairly within the scope of the appended claims.

This invention described herein may be manufactured and used by or for the Government of the United States of America for government purposes without the payment of any royalty thereon or therefor.

1. What is claimed is:

1. A water-depth indicator comprising a sinkable container, a plurality of buoyant signal elements releasably carried by said container, means barring the release of certain said signal elements and operable in response to different degrees of hydrostatic pressure to withdraw from barring relation with certain of said signal elements according to the hydrostatic pressure and means holding all of said signal elements against release for a predetermined time independently of said barring means.

2. A water-depth indicator comprising a sinkable container, a plurality of buoyant signal elements releasably carried by said container, means barring the release of certain of said signal elements and operable in response to different degrees of hydrostatic pressure to withdraw from barring relation with certain of said signal elements according to the hydrostatic pressure and means holding all of said signal elements against release for a predetermined time independently of said barring means, said holding means releasing subsequently to said barring means.

3. A water-depth indicator comprising a sinkable container, a plurality of buoyant signal elements releasably carried by said container, means barring the release of certain of said signal elements and operable in response to different degrees of hydrostatic pressure to withdraw from barring relation with certain of said signal elements according to the hydrostatic pressure and means holding all of said signal elements against release for a predetermined time independently of said barring means, said holding means being responsive to submergence and having a time constant greater than that required for full operation of the barring means.

4. A water-depth indicator comprising a carrier, a plurality of buoyant signal elements releasably carried by said carrier, barring means normally barring the release of certain of said signal elements and normally out of barring relation with a certain one of said signal elements and operated in response to variations in hydrostatic pressure to withdraw from barring relation with certain of said signal elements and move into barring relation with said certain one of said signal elements, and means holding all of said signal elements against release for a predetermined time independently of said barring means.

5. A water-depth indicator comprising a sinkable container, a plurality of buoyant signal elements releasably carried by said container, means barring the release of certain of said signal element and operable in response to different degrees of hydrostatic pressure to withdraw from barring relation with certain of said signal elements according to the hydrostatic pressure and means holding all of said signal elements against release for a predetermined time independently of said barring means and longer than required for the container to sink to a given maximum depth and the barring means to complete its operation, together with a photographable element contained within each signal element, ejecting means for each signal element normally tending to eject the photographable element from the signal element, and ejection timing means holding said photographable element against ejection for a time longer than the time period of said holding means.

6. A water-depth indicator comprising a sinkable container, a plurality of buoyant signal elements releasably carried by said container, means barring the release of certain of said signal elements and operable in response to different degrees of hydrostatic pressure to withdraw from barring relation with certain of said signal elements according to the hydrostatic pressure, a first timing means holding all of said signal elements against release for a predetermined time independently of said barring means and longer than required for the container to sink to a given maximum depth and the barring means to complete its operation, together with a photographable element contained within each signal element, ejecting means for each signal element normally tending to eject the photographable element from the signal element, and ejection timing means holding said photographable element against ejection for a time longer than the time period of said first timing means, both said first and second timing means comprising a holding element adapted to be weakened in the presence of water to a degree variable with time.

7. A water depth indicator comprising a sinkable carrier, a plurality of buoyant signal elements carried by said carrier, resilient means tending to eject said signal elements from the carrier, time controlled release means holding all of said signal elements against ejectment from said carrier, a substantially hermetically sealed chamber element, a displacement element between the interior of the chamber and the surrounding outside space substantially freely movable to equalize the pressure within the chamber with that in the neighboring, outside space, barring means normally barring a plurality of said signal elements against ejectment independently of said release means and normally out of engagement with said signal elements, and means connecting said barring means with said movable displacement element for varying the barring relationship of said barring means to said signal elements in response to variations in hydrostatic pressure.

8. A water-depth indicator comprising a sinkable carrier, a plurality of buoyant signal elements carried by said carrier, resilient means tending to eject said signal elements from the carrier, time controlled release means holding all of said signal elements against ejectment from said carrier, a substantially hermetically sealed chamber element, a displacement element between the interior of the chamber and the surrounding outside space substantially freely movable to equalize the pressure within the chamber with that in the neighboring, outside space, barring means normally barring a plurality of said signal elements against ejectment independently of said release means and normally out of frictional engagement with said signal elements, and means connecting said barring means with said movable displacement element for varying the barring relationship of said barring means to said signal elements in response to variations in hydrostatic pressure, said buoyant signal-elements each comprising a cartridge containing a different kind of photographable signal in the form of a powder, resilient means normally tending to eject the powder, time controlled holding means holding said powder against ejectment and operable to release the powder a predetermined time after wetting.

9. A water-depth indicator comprising a sinkable carrier, a plurality of buoyant signal elements carried by said carrier, resilient means tending to eject said signal elements from the carrier, time controlled release means holding all of said signal elements against ejectment from said carrier, a substantially hermetically sealed chamber element, a displacement element between the interior of the chamber and the surrounding outside space substantially freely movable to equalize the pressure within the chamber with that in the neighboring, outside space, barring means normally barring a plurality of said signal elements against ejectment independently of said release means and normally out of engagement with said signal elements, and means connecting said barring means with said movable displacement element for varying the barring relationship of said barring means to said buoyant signal-elements in response to hydrostatic pressure, said buoyant signal means each comprising a cartridge containing a different kind of photographic signal in the form of a powder, resilient means normally tending to eject the powder, time controlled holding means holding said powder against ejectment and operable to release the powder a predetermined time after wetting, said predetermined time period being substantially greater than the time constant of said first mentioned time controlled release means.

References Cited in the file of this patent

UNITED STATES PATENTS

| | | |
|---|---|---|
| 230,661 | Rousset | Aug. 3, 1880 |
| 409,780 | Flad | Aug. 27, 1889 |
| 637,147 | Moriarty | Nov. 14, 1899 |
| 1,281,967 | Irwin | Oct. 15, 1918 |
| 1,287,580 | Dumaine | Dec. 10, 1918 |
| 1,348,595 | Staud y Ximenez | Aug. 3, 1920 |
| 1,789,158 | Rudolph et al. | Jan. 13, 1931 |
| 2,328,916 | Le Comte | Sept. 7, 1943 |

FOREIGN PATENTS

| | | |
|---|---|---|
| 280,738 | Italy | Dec. 8, 1930 |